_United States Patent Office_

3,172,907
Patented Mar. 9, 1965

3,172,907
PRODUCTION OF ALIPHATIC DISULFONATE INTERMEDIATES
Walter Thomas and Rudolf Strobele, Marl, Germany, assignors to Chemische Werke Huls Aktiengesellschaft, Marl, Germany, a corporation of Germany
No Drawing. Filed Nov. 15, 1962, Ser. No. 238,016
Claims priority, application Germany, Feb. 19, 1962, C 26,266
3 Claims. (Cl. 260—513)

It is known to react unsaturated organic compounds that contain a non-activated olefinic double bond with at least two equivalents of a water soluble acid sulfite under oxidizing conditions, preferably with the use of air and then to oxidize to the disulfonate. This process serves to convert short chain olefinic compounds such as allyl alcohol into the corresponding disulfonates. With increasing chain length the reactivity decreases rapidly so that butenediol and diisobutylene require reaction times of 5 to 6 hours and with compounds of still greater chain lengths the reaction fails practically completely.

Since the disulfonates of long chain organic compounds possess a sufficient surface active potential to make them suitable for use as emulsifiers or washing agents there is a great technical interest in a process for the production of these compounds.

It has been found that aliphatic disulfonates are formed when olefines having from 8 to 36 carbon atoms are reacted with at least two equivalents of a water soluble salt of sulfurous acid in aqueous solution in the presence of an organic solvent and an organic nitro compound and the intermediate product formed by this reaction is oxidized to the disulfonate.

Olefines suitable for use in the process include single compounds containing from 8 to 36 carbon atoms such as hexadecene-1 and dodecene-1 as well as such mixtures of olefines as are readily obtainable by cracking aliphatic hydrocarbons and by dehydration of fatty alcohols and if desired worked up without special expense to narrow cuts of compounds having uniform properties such as mixtures of olefines having from 15 to 18 carbon atoms. An especially smooth reaction occurs with olefines in which the double bond is in the end position.

Sodium bisulfite is especially suitable for use in the process but the bisulfites of potassium, ammonium and the alkaline earth metals and mixtures thereof may be used.

The organic solvent facilitates the reaction between the olefine and the aqueous bisulfite solution. It must, under the conditions of the reaction, be sufficiently resistant to the action of the nitro compound. An especially suitable organic solvent is isopropyl alcohol but other polar solvents such as methyl alcohol and ethyl alcohol and pyridine have been found to be useful.

Suitable nitro compounds for use in the process are, for example, the reaction products that are formed by the action of concentrated or fuming nitric acid at 20–150° C., preferably 70–80° C., upon such olefines as can be reacted with sulfurous acid salts. However the invention is not limited to the use of nitro compounds that are obtainable by the reaction of nitric acid on olefines that are branched at the end or α-olefines that are branched at the double bond. The crude reaction products as well as more nearly pure mixtures obtainable therefrom by distillation which consist principally of nitro olefines and nitro alcohols are also useful. Pure nitro alcohols made in other ways as by reacting nitroalkanes with aldehydes as well as the so formed esters and the nitro olefines produced by splitting out water also are useful. Also the cycloaliphatic nitro alcohols and nitro olefines may be used.

An especially simple procedure in accordance with the invention consists in heating an α-olefine that is unbranched at the double bond to about 70–80° C. and mixing it with about 1% of fuming nitric acid and then, after the end of the resulting reaction and in the same reaction vessel introducing the organic solvent and the aqueous bisulfite solution and finally oxidizing the mixture.

The reaction between the olefine and the nitric acid takes place at a temperature between 70 and 80° C., generally within from 5 to 30 minutes if a preformed reaction accelerator is present.

By the use of 0.5 to 5%, preferably about 2% of nitro compound in the reaction mixture the required time for the reaction between an olefine containing from 8 to 20 carbon atoms and the bisulfite is reduced to from one-tenth to one-twentieth of that required when oxygen, organic peroxide or hydrogen peroxide is used. The reaction with long chain olefines is practically possible only in the presence of nitro compound.

The reaction suitably is carried out with stirring of the reaction mixture at the boiling temperature of the organic solvent. By rapid iodometric back titration of the unconsumed bisulfite in the cold and with a small excess of iodine the end of the reaction can be easily detected. Also, by titration of the residual bisulfite with alkaline sodium hypochlorite solution together with the formed and still oxidizable added sulfurous acid residue one can detect that the sulfurous acid residue bound to the hydrocarbon in addition to the sulfo group is to a small extent also oxidized to the sulfo group. The reaction is ended as soon as it appears that two equivalents of sulfite are bound. This can be determined titrimetrically.

The oxidation of the intermediate product to the disulfonate can be carried out directly after the addition reaction by treating the dissolved raw product with an oxidizing agent such as hydrogen peroxide, bleaching powder solution, air or chlorine. The oxidation is carried out suitably at the boiling temperature of the solvent at atmospheric pressure or under superatmospheric pressure. The end of the reaction can be determined by titration with hypochlorite upon the disappearance of lower valence sulfur from the solution.

The disulfonate can be recovered by evaporation. The product is recovered in especially pure crystalline form if methyl alcohol is not present as the solvent by distilling the organic solvent and adding to the remaining aqueous solution sufficient methyl alcohol to give a ratio of water to methyl alcohol of about 2 to 1. Then upon cooling the disulfonate crystallizes out.

The disulfonates made by the present process exhibit a materially better water solubility than the monosulfonate made from the same starting material by known processes.

*Example 1*

1 g. of 100% nitric acid was added to 100 g. of olefines from cracked white wax having a chain length of from $C_{15}$ to $C_{18}$ and an average molecular weight equal to that of a $C_{16}$ olefine at 70° C. After a few minutes 80 g. of isopropanol and 95 g. of sodium sulfite in the form of a 30 to 35% aqueous solution were added to the reaction mixture. The mixture was then stirred for 2 hours at 80 to 82° C. and became homogeneous. Titration with iodine showed that 2.2 g. of free bisulfite remained in the mixture. A stream of air was then bubbled through the solution at the rate of 15 liters per hour at 80° C. for 5 hours and the solution was then mixed with 10 g. of 35% hydrogen peroxide. By extraction of the neutral oil content with petroleum ether the amount of unreacted olefine was found to be 2.5 g.

The isopropanol was recovered for reuse by distillation. Finally the solution was spray dried and the disulfonate recovered as a white powder.

The effectiveness of air instead of nitro compound as reaction promoter is shown by the following comparative tests.

224 g. (1 mol.) of the same olefine produced by cracking is heated to boiling in admixture with 160 g. of isopropanol and 228 g. of sodium bisulfite (2 mol.) in the form of a 30–35% water solution in a reaction vessel provided with a stirrer, a reflux and a gas introduction porous plate. The mixture was maintained at boiling temperature for 20 hours with vigorous stirring with the introduction of air at the rate of 0.5–1 liter per hour. At the end of this time the operation was interrupted and by weighing the unused olefine and titration of the unused bisulfite the results were as follows Olefine—190 g.
Sulfite—176 g.

In spite of the fact that the reaction time was ten times as long only 0.15 mole of the olefine and 0.5 mole of the bisulfite, including that which was oxidized was consumed.

*Example 2*

100 g. of the same olefine as was used in Example 1 was mixed with 1 g. of nitrohexanol, 80 g. of isopropanol and 95 g. of sodium bisulfite in the form of a 30–35% water solution. The nitrohexanol was obtained by nitrating hexene-1 with concentrated nitric acid at 70° C. and had the properties B.P.: 83–86° C./1 mm. Hg, $n_D^{20}$: 1.4485. After 60 minutes reaction time at 80° C. titration of the reaction mixture with iodine showed the presence of 2.8 g. of free bisulfite. The neutral oil content of the reaction mixture was 3.2 g. The oxidation of the intermediate product and the working up of the solution as in Example 1 gave the disulfonate as a white powder.

*Example 3*

100 g. of the same olefine as was used in Example 1 was mixed with 3 g. of 1-nitrohexene-1 and caused to react with 80 g. of isopropanol and 95 g. of sodium bisulfite in the form of a 30–35% water solution at 80–82° C. After 150 minutes the mixture was homogeneous. Titration showed the presence of 2.3 g. of free bisulfite. The neutral oil content was 4 g. The oxidation of the intermediate product and the working up of the solution were carried out as in Example 1.

*Example 4*

100 g. of octene-1 was mixed with 2 g. of 1-nitropentanol (produced by reacting butyraldehyde with nitromethane), 200 g. of ethanol and 185 g. of sodium bisulfite in the form of a 30–35% water solution. The mixture was heated for 90 minutes with stirring at its boiling temperature. The reaction was then interrupted. Titration with iodine showed the presence of 5.2 g. of free bisulfite in the mixture. The oxidation of the intermediate product and the further working up of the solution were carried out as in Example 1.

*Example 5*

100 g. of olefines made by cracking, having an average chain length of $C_{20}$ was mixed with 2 g. of 2-nitrocyclohexanol, 80 g. of isopropyl alcohol and 80 g. of sodium bisulfite in the form of a 30–35% water solution. The mixture was heated for 150 minutes with stirring at boiling temperature and became homogeneous. Titration with iodine showed 4.9 g. of free bisulfite. The oxidation of the intermediate product and the further working up of the solution were carried out as in Example 1. An extraction with petroleum ether gave 2.8 g. of neutral oil.

We claim:

1. Process for the production of intermediates oxidizable to aliphatic disulfonates which comprises heating a mixture of a terminal olefine having from 8 to 36 carbon atoms per molecule and at least two chemical equivalents of a water soluble bisulfite selected from the group consisting of sodium, potassium, ammonium and the alkaline earth metal bisulfites in water solution and from 0.5 to 5% by weight based upon the weight of the reaction mixture of an organic nitro compound selected from the group consisting of nitroolefines and nitroalkanols and an organic solvent which does not react with said organic nitro compound to the boiling point of the mixture.

2. Process as defined in claim 1 in which the organic nitro compound is a nitroolefine.

3. Process as defined in claim 1 in which the organic nitro compound is a nitroalkanol.

References Cited in the file of this patent
FOREIGN PATENTS

| | | |
|---|---|---|
| 831,993 | Germany | Feb. 18, 1952 |
| 1,250,163 | France | Nov. 28, 1960 |